United States Patent
Taruishi et al.

(10) Patent No.: US 8,656,358 B2
(45) Date of Patent: Feb. 18, 2014

(54) PLANT CONTROL SYSTEM AND INTERLOCK FACTOR SPECIFYING METHOD

(75) Inventors: Hajime Taruishi, Sayama (JP); Akira Nojima, Kunitachi (JP)

(73) Assignees: Kabushiki Kaisha Toshiba, Tokyo (JP); Toshiba Mitsubishi-Electric Industrial Systems Corporation, Tokyo (JP)

( * ) Notice: Subject to any disclaimer, the term of this patent is extended or adjusted under 35 U.S.C. 154(b) by 1277 days.

(21) Appl. No.: 12/161,223

(22) PCT Filed: Jan. 24, 2006

(86) PCT No.: PCT/JP2006/301034
§ 371 (c)(1),
(2), (4) Date: Jul. 17, 2008

(87) PCT Pub. No.: WO2007/086101
PCT Pub. Date: Aug. 2, 2007

(65) Prior Publication Data
US 2010/0241246 A1   Sep. 23, 2010

(51) Int. Cl.
*G06F 9/44* (2006.01)
*G05B 11/01* (2006.01)
*G05B 15/00* (2006.01)
*G06F 11/00* (2006.01)

(52) U.S. Cl.
USPC ............... 717/125; 717/124; 700/17; 700/83; 714/38.1

(58) Field of Classification Search
USPC ......... 717/100, 124–135; 700/17, 83; 714/37, 714/38.1
See application file for complete search history.

(56) References Cited

U.S. PATENT DOCUMENTS

| | | | |
|---|---|---|---|
| 4,115,848 A * | 9/1978 | Kogure et al. | 700/34 |
| 5,068,080 A * | 11/1991 | Impink et al. | 376/215 |
| 5,148,363 A | 9/1992 | Sakamoto et al. | |
| 5,251,122 A | 10/1993 | Sakamoto et al. | |
| 5,265,131 A * | 11/1993 | Scarola et al. | 376/259 |

(Continued)

FOREIGN PATENT DOCUMENTS

| | | |
|---|---|---|
| JP | 56-101211 | 8/1981 |
| JP | 56-149608 | 11/1981 |

(Continued)

OTHER PUBLICATIONS

Notification of Reasons for Rejection issued by the Korean Patent Office on Mar. 3, 2010, for Korean Patent Application No. 10-2008-7015206, and English-language translation thereof.

(Continued)

*Primary Examiner* — Qing Chen
(74) *Attorney, Agent, or Firm* — Finnegan, Henderson, Farabow, Garrett & Dunner, L.L.P.

(57) ABSTRACT

This disclosure describes, for a example, a plant control system comprising: program editing means for creating a control program including an interlock condition and diagnosis of interlock; plant control means for executing a program object in the control program; and interlock diagnosing means for updating and displaying satisfaction/dissatisfaction of the interlock condition at a predetermined point before the present, further specifying only a source factor variable of the dissatisfaction even if plural stages of interlock circuits are formed, and automatically displaying the source factor variable in a graphic language, the interlock diagnosing means having a logical operation unit and a display unit.

5 Claims, 6 Drawing Sheets

(56) References Cited

U.S. PATENT DOCUMENTS

| | | | |
|---|---|---|---|
| 5,291,190 A * | 3/1994 | Scarola et al. | 340/3.32 |
| 5,301,103 A | 4/1994 | Sakamoto et al. | |
| 5,392,208 A * | 2/1995 | Takita et al. | 700/83 |
| 5,898,860 A * | 4/1999 | Leibold | 703/6 |
| 6,026,336 A * | 2/2000 | Sakurai et al. | 700/86 |
| 6,108,800 A * | 8/2000 | Asawa | 714/47.3 |
| 6,411,858 B1 * | 6/2002 | Sakurai et al. | 700/18 |
| 7,146,257 B2 * | 12/2006 | Tanaka et al. | 700/286 |
| 2003/0139837 A1 * | 7/2003 | Marr | 700/110 |
| 2005/0228545 A1 * | 10/2005 | Tanaka et al. | 700/286 |

FOREIGN PATENT DOCUMENTS

| | | |
|---|---|---|
| JP | 61-153707 | 7/1986 |
| JP | 04-286001 | 10/1992 |
| JP | 05-113820 | 5/1993 |
| JP | 08-179814 | 7/1996 |
| JP | 09-288512 | 11/1997 |
| JP | 10-240338 | 9/1998 |
| JP | 11-024728 | 1/1999 |
| JP | 11-242507 | 9/1999 |
| JP | 2006-024015 | 1/2006 |
| KR | 94-007723 | 8/1994 |
| KR | 10-2004-0022748 A | 3/2004 |

OTHER PUBLICATIONS

Notification of Reason for Rejection, issued in Japanese Patent Application No. 201978/2004, mailed: Dec. 8, 2006.
Notification of Reason for Rejection, issued in Japanese Patent Application No. 201978/2004, mailed: Jul. 13, 2007.
Decision of Rejection, issued in Japanese Patent Application No. 201978/2004, mailed Mar. 4, 2008.
International Search Report mailed on May 2, 2006 in international application No. PCT/JP2006/301034.
International Preliminary Report on Patentability and Written Opinion issued by the International Bureau of WIPO on Aug. 7, 2008, for International Application No. PCT/JP2006/301034.

* cited by examiner

PLANT CONTROL SYSTEM AND INTERLOCK FACTOR SPECIFYING METHOD

TECHNICAL FIELD

The present invention relates to a plant control system, and, more particularly to an apparatus that performs creation, display, and diagnosis of a plant control program.

BACKGROUND ART

In general, in a plant control system, a system programmer provides a plant operator with a program for automatically operating a plant after creating the program as a control program for a plant control apparatus and tests and adjusts the program.

In order to safely control a plant, the system programmer has to install an interlock condition for startup and operation of plant equipment such as a rotary machine (a condition for permission of equipment operation) in the control program. Naturally, it is a matter of interest for the plant operator whether the interlock condition is satisfied. Therefore, it is demanded that the interlock condition is plainly presented to the plant operator.

As a plant control system in the past, a plant control system that displays an interlock state diagram when plant equipment abnormally stops is proposed (see Japanese Patent Laid-Open No. 11-242507).

DISCLOSURE OF THE INVENTION

However, the plant control apparatus system disclosed in Japanese Patent Laid-Open No. 11-242507 has drawbacks described below.

(a) An interlock diagram same as an interlock program created by a system programmer is used for interlock diagnosis and display. Therefore, when there are a large number of input signals in an interlock circuit, it is difficult to learn at a glance a contact that causes dissatisfaction of an interlock condition. In the case of a so-called multistage interlock circuit in which a contact of an interlock circuit is an output coil of another interlock circuit, it is impossible to track back the circuit to learn a contact as a factor of dissatisfaction.

(b) The plant control apparatus system stores a status of only one cycle in which the interlock condition is dissatisfied. Therefore, when there are plural contacts as factors of the dissatisfaction of the interlock condition and the contacts are OR logical elements, it is impossible to learn a factor signal of which of the contacts that is a trigger and causes interlock dissatisfaction, i.e., a first cause of the interlock dissatisfaction.

(c) It cannot be said that a uniform programming method for diagnosing present factors, latest factors in the past, and a first factor in the latest factors in the past of the interlock dissatisfaction is presented to the system programmer. Therefore, it is difficult both technically and economically for the system program to realize an interlock diagnostic function.

The present invention has been devised in view of the points described above and it is an object of the present invention to provide a plant control system that has:

1) a function of creating and executing a uniform control program for diagnosing an interlock condition;

2) a function of displaying a ladder circuit including only plural factor signals when plant equipment cannot be started; and 3) a function of displaying a ladder circuit including only plural factor signals and a trigger signal of the factor signals when the plant equipment is abnormally stopped.

In order to attain the object, the present invention provides a plant control system including program editing means for creating a control program including an interlock condition and diagnosis of interlock, plant control means for executing a program object in the control program, and interlock diagnosing means for updating and displaying satisfaction/dissatisfaction at a predetermined point before a present point of the interlock condition or latest time when the interlock condition was dissatisfied in the past, further specifying only a source factor variable of the dissatisfaction even if plural stages of interlock circuits are formed, and automatically displaying the source factor variable in a graphic language, the interlock diagnosing means having a logical operation unit and a display unit.

Figure 2:
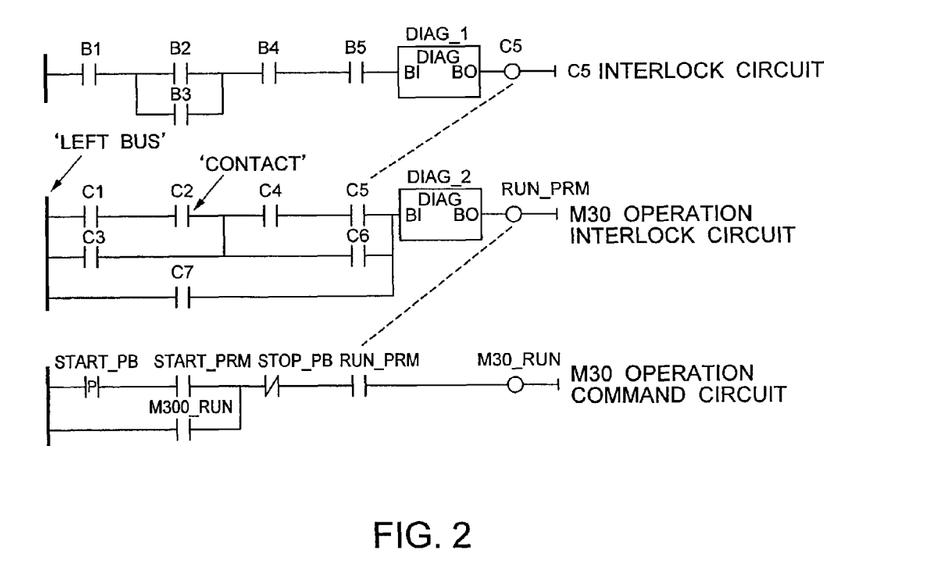
FIG. 2 is a sequence chart showing an example of a control program including interlock.

The present invention can, on the one hand, provide a system programmer with a uniform and simple programming method for inserting an interlock diagnostic function block DIAG shown in FIG. 2 in an existing interlock circuit and, on the other hand, provide a plant operator with a present factor contact and trigger contact, a latest factor contact and trigger contact in the past, a factor contact and trigger contact contacts at the time of interlock dissatisfaction as a ladder circuit in a form that can be understood at a glance.

DESCRIPTION OF SYMBOLS

10: Control-program editing means, 11: Program compiler, 12: Ladder-to-logical-expression converting unit, 13: Program-load client unit, 20: Interlock diagnosing means, 21: Logical-expression readout unit, 23: Factor-specified logical-expression converting unit, 24: Logical-expression combining unit, 25: Logical-expression-to-ladder converting unit, 30: Database unit, 31: Source file unit, 32: Object file unit, 33: Logical-expression file unit, 40: Object memory, 41: Data memory, 42: Code memory, 50: Standard processing unit, 51: Program-load server unit, 52:

Program-execution processing unit, 53: Process-input/output processing unit, 54: Interlock-state readout server unit. C: Contact, LAN: Local Area Network.

BEST MODE FOR CARRYING OUT THE INVENTION

Embodiments of the present invention will be hereinafter explained in detail with reference to the accompanying drawings.

First Embodiment (Configuration)

First, a first embodiment is explained using FIGS. 1 to 8.

Figure 1:
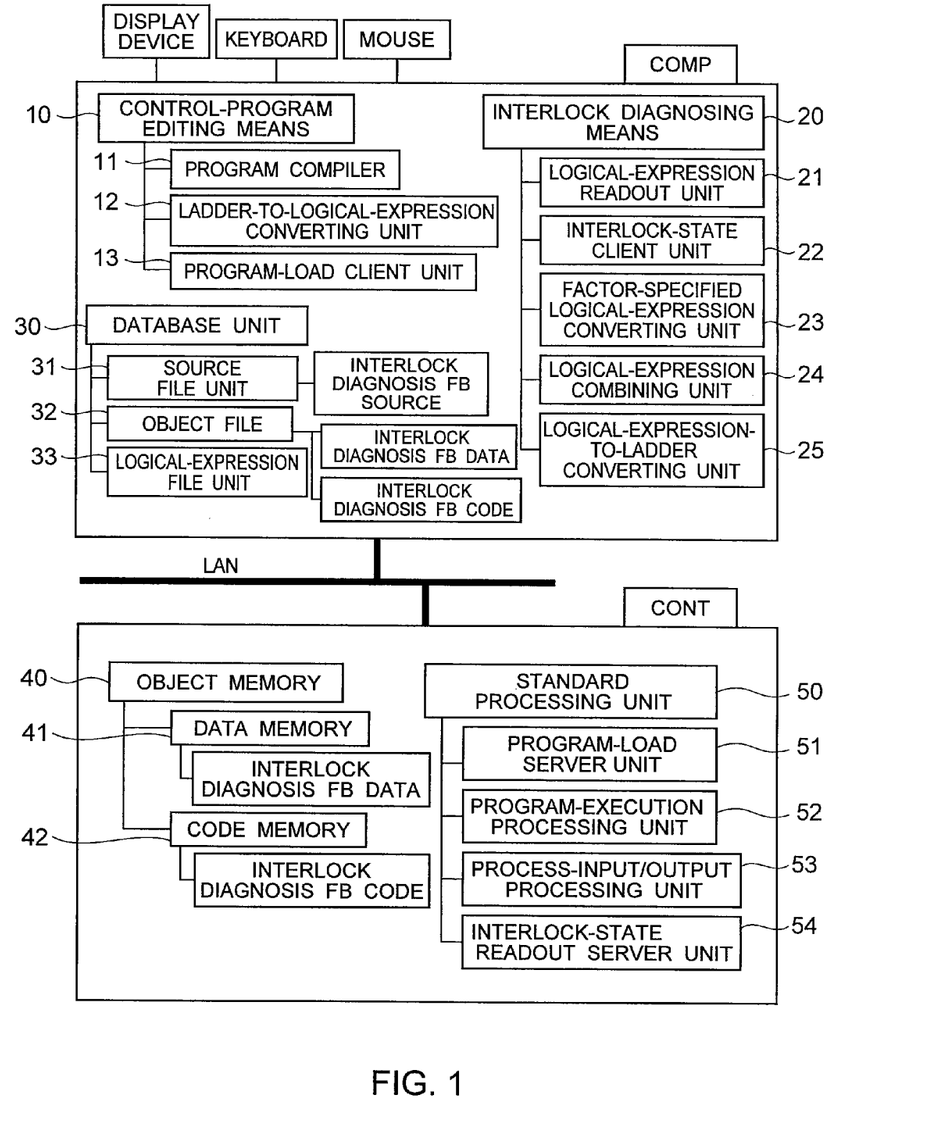
FIG. 1 is a conceptual diagram showing an overall configuration according to a first embodiment of the present invention.

FIG. 1 is an overall diagram of the first embodiment of the present invention. The first embodiment roughly includes three sections: a controller CONT as a plant control apparatus, a computer COMP as a control program creating and displaying apparatus, and a LAN (local area network) that connects the controller CONT and the computer COMP.

The controller CONT roughly includes two sections: an object memory 40 for storing control program objects and a standard processing unit 50 that performs writing, readout, and execution of the control program objects. Moreover, the object memory 40 includes a data memory 41 and a code memory 42.

The data memory 41 includes internal data of an interlock diagnosis function block DIAG described later besides normal variables. The code memory 42 includes internal codes of the interlock diagnosis function block besides normal program codes.

The standard processing unit 50 includes a program-load server unit 51 for arranging object programs of control programs transmitted through the LAN in the data memory 41 and the code memory 42, a program-execution processing unit 52 for executing a control program in the controller CON, i.e., a code memory, a process-input/output processing unit 53 for giving a process signal from a plant to the control program, and an interlock-state-readout server unit 54 for reading out an interlock circuit state during execution of the control program.

On the other hand, the computer COMP roughly includes three sections: control-program editing means 10 with which a system programmer creates a control program, a database unit 30 that stores the control program and a logical expression for interlock, and interlock diagnosing means 20 with which a plant operator learns a cause of dissatisfaction of interlock.

The control-program editing means 10 includes a program compiler 11 for converting a source file of the control program into an object file as internal processing, a ladder (LD) to logical expression converting unit 12 for converting an interlock circuit designated in the control program into a logical expression, and a program-load client unit 13 for transmitting the object file of the control program to the controller.

The database unit 30 includes a source file unit 31 for storing the source file of the control program, an object file unit 32 for storing the object file of the control program, and a logical-expression file unit 33 for storing the logical expression of the designated interlock circuit.

The source file unit 31 includes a source of the interlock diagnosis function block described later. The object file unit 32 includes internal data and codes of the interlock diagnosis function block described later.

The interlock diagnosing means 20 includes a logical operation unit and a display unit. The logical operation unit includes a logical-expression readout unit 21 for reading out a logical expression of a designated interlock from a file, an interlock-state readout client unit 22 for reading out contact states in the past and present contact states of the designated interlock circuit from the controller, a factor-specified logical-expression converting unit 23 for specifying a factor of dissatisfaction of interlock from the logical expression and the contact states of the interlock-state readout client unit 22, a logical-expression combining unit 24 for combining logical expressions in multiple stages into one logical expression, and a logical expression to ladder (LD) converting unit 25 for rendering a ladder from the logical expression. The display unit displays a result of operation by the logical operation unit.

(Actions)

The system programmer creates a control program including an interlock logic of plant equipment using the control-program editing means 10.

FIG. 2 is an example of a control program created by using a ladder language defined by JISB3503 (or IEC61131-3). Content of the control program indicates an interlock circuit and a startup circuit that operate a rotary machine M30.

In order from above in FIG. 2, an interlock circuit that outputs an interlock condition C5, an interlock circuit that outputs an operation condition for M30, and a circuit for an M30 operation command are provided.

The interlock circuit at the top includes contacts B1 to B5, an interlock diagnosis function block DIAG, and a coil C5. A contact C5 of this coil C5 is inserted into the M30 operation interlock circuit in the second from the top. This M30 operation interlock circuit in the second from the top includes contacts C1 to C7, an interlock diagnosis function block DIAG, and a coil RUN_PRM. A contact RUN_PRM of this coil RUN_PRM is inserted in the M30 operation command circuit in the third from the top. The M30 operation circuit includes contacts START_PB, START_PRM, STOP_PB, M300_RUN, and RUN_PRN, and a coil M30_RUN.

The interlock circuit has a characteristic for connecting the interlock diagnosis function block DIAG before a coil output thereof. When a system programmer saves a control program, the control program is stored in the source file unit 31 of the database unit 30. As a source file, a result generated by the program compiler 11 is saved as the object file 32 of the database unit 30.

At this point, when the ladder-to-logical-expression converting unit 12 finds the interlock diagnosis function block, the ladder-to-logical-expression converting unit 12 searches through a ladder circuit connected to an input of the interlock diagnosis function block, creates a logical expression of interlock, and saves the logical expression as a logical expression file of the database unit 30.

Figure 3:
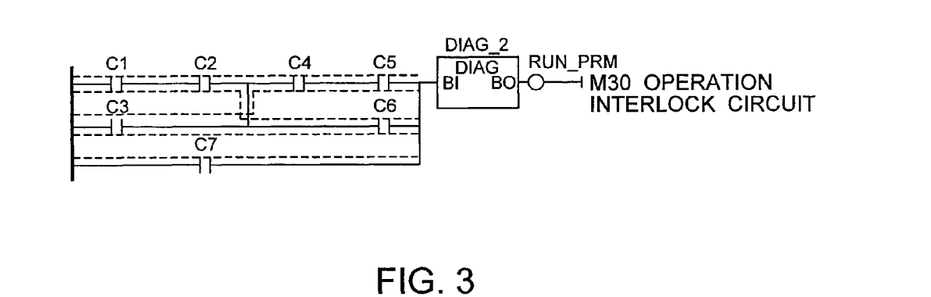
FIG. 3 is an explanatory diagram showing a conversion logic of a ladder-to-logical-expression converting unit.

FIG. 3 shows a conversion logic of the latter to logical expression converting unit 12. This conversion logic is explained below. The logical expression of interlock can be indicated as a logical sum of power flows in all paths to a left bus by using a principle of power flow superimposition of a ladder circuit connected to an input argument BI of the interlock diagnosis function block DIAG.

This ladder-to-logical-expression converting unit 12 includes contacts C1 to C7, an interlock diagnosis function block DIAG, and a coil RUN_PRM. The logical expression is a logical sum of five paths as described below.

$$BI = C1 \cdot C2 \cdot C4 \cdot C5 + \qquad \text{Path 1}$$

$$C1 \cdot C2 \cdot C6 + \qquad \text{Path 2}$$

$$C3 \cdot C4 \cdot C5 + \qquad \text{Path 3}$$

$$C3 \cdot C6 + \qquad \text{Path 4}$$

$$C7 \qquad \text{Path 5}$$

Values of the respective paths are indicated by logical products of contact states in the paths. Therefore, eventually, a logical expression of the interlock circuit can be calculated in a sum of products form.

A data structure, in which names of contact variables are arranged as a one-dimensional character string array, for saving the logical expression as data is as shown below.

TABLE 1

| | |
|---|---|
| 'C1' | +0 |
| 'C2' | +1 |
| 'C3' | +2 |
| 'C4' | +3 |
| 'C5' | +4 |
| 'C6' | +5 |
| 'C7' | +6 |

A two-dimensional array of the logical expression is as shown below.

TABLE 2

| | +0 | +1 | +2 | +3 | +4 | +5 | +6 |
|---|---|---|---|---|---|---|---|
| Path1 | 1 | 1 | 0 | 1 | 1 | 0 | 0 |
| Path2 | 1 | 1 | 0 | 0 | 0 | 1 | 0 |
| Path3 | 0 | 0 | 1 | 1 | 1 | 0 | 0 |
| Path4 | 0 | 0 | 1 | 0 | 0 | 1 | 0 |
| Path5 | 0 | 0 | 0 | 0 | 0 | 0 | 1 |

It is sufficient that indexes of the one-dimensional array of the contact variables are associated with column indexes of the two-dimensional array of the logical expression to form a two-dimensional array having a BOOL type as an element in which respective logical product terms are associated with the indexes, and 1 is set in contact variables included in the respective logical product terms and 0 is set in spaces of contact variables not included in the logical product terms.

Moreover, a variable name of an interlock diagnosis function block that diagnoses this interlock circuit and outputs of the logical expression, i.e., a variable name of a coil to be an inter lock signal are added and stored in the logical-expression file unit 33 of the database unit 30 for each interlock circuit.

Here, the FB variable name for diagnosis is as shown below.

TABLE 3

| |
|---|
| 'DIAG_2' |

The coil variable name is as shown below.

TABLE 4

| |
|---|
| 'RUN_PRM' |

The system programmer performs, after creating and saving the control program as described above, writing of the control program in the controller CONT and causes the controller CONT to execute the control program. In writing the control program in the controller CONT, internally, the program-load client unit 13 extracts the object file 32 of the database unit 30 and transfers the object file 32 to the program-load server unit 51 of the controller CONT through the LAN. The program-load server unit 51 receives the object file 32 and arranges the object file 32 on the data memory 41 and the code memory 42 of the object memory 40. Moreover, the program-execution processing unit 52 executes the object file 32 and the control program is executed.

Signals of the contacts and the coil of the interlock circuit are process signals that should be inputted and outputted between the interlock circuit and the controller outside CONT. The process signals are given from the process-input/output processing unit 53 to the program-execution processing unit 52 and operate.

Figure 4:
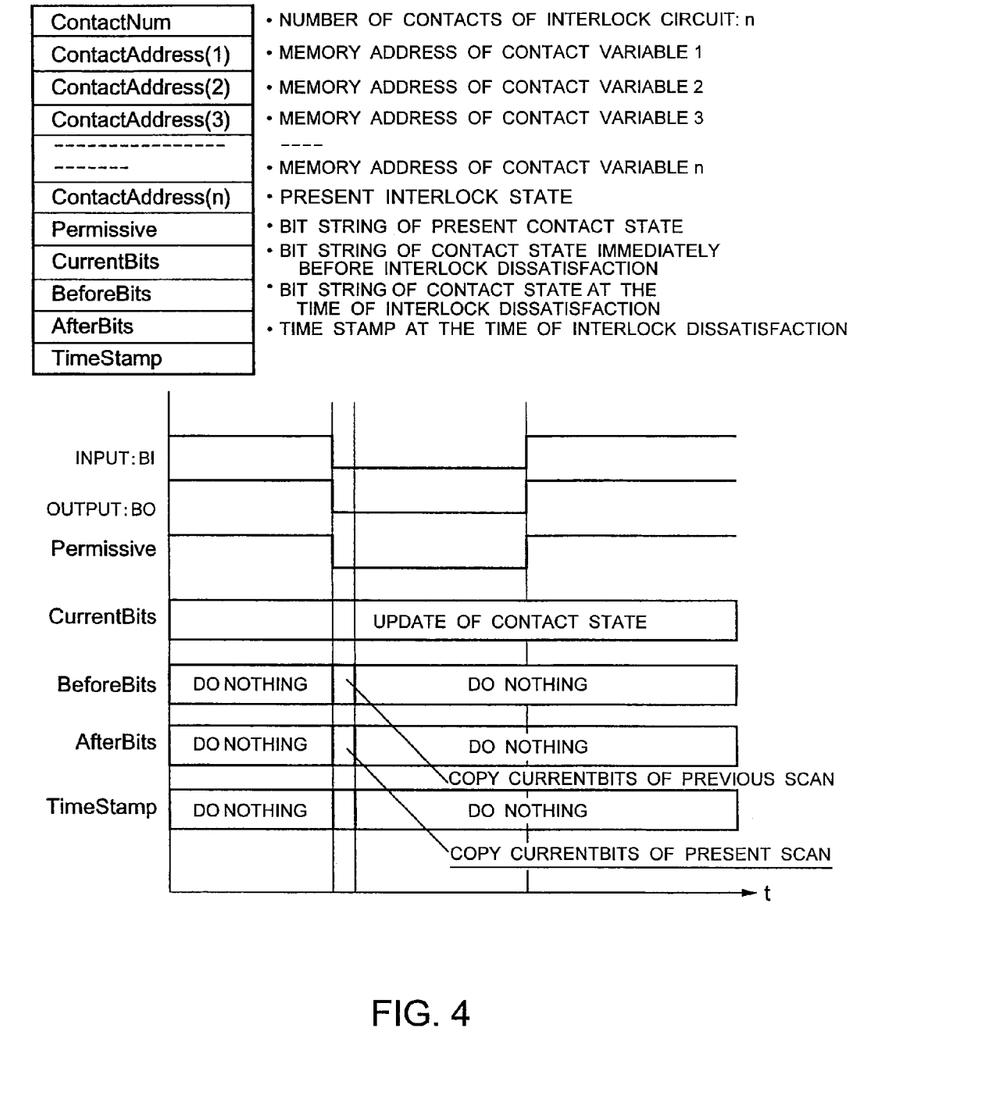
FIG. 4 is an explanatory diagram showing internal data and operations of an interlock diagnostic function block.

It is explained with reference to FIG. 4 how the interlock diagnosis function block records an interlock state of the control program. FIG. 4 shows internal data and operations of the interlock diagnosis function block. The interlock diagnosis function block has internal data in order to operate. This internal data is included in function block variables such as an interlock diagnosis function block_1 (DIAG_1) and an interlock diagnosis function block_2 (DIAG_2) shown in FIG. 2.

Among these internal data, ContactNum indicating the number of contacts n of the interlock circuit and ContactAddress(1)-ContactAddress(n) indicating memory addresses of contact variables (1 to n) are given as values of an object file at the time of compilation of the control program shown in FIG. 2. On this premise, during controller execution, the interlock diagnosis function block always outputs an input BI to an output BO, saves the input BI in internal data permissive, and saves values of contact variables indicated by ContactNum and ContactAdrress(1)-ContactAddress(n) in a bit string CurrentBits of a present contact state.

Moreover, when the input BI changes from ON to OFF (i.e., from satisfaction to dissatisfaction of interlock), the interlock diagnosis function block stores a value of the last time of CurrentBits in a bit string BeforeBits in a contact state immediately before interlock is dissatisfied, stores a value of this time of CurrentBits in a bit string AfterBits of a contact state at the time when interlock is dissatisfied, and stores a time stamp TimeStamp at the time when interlock is dissatisfied.

Figure 5:
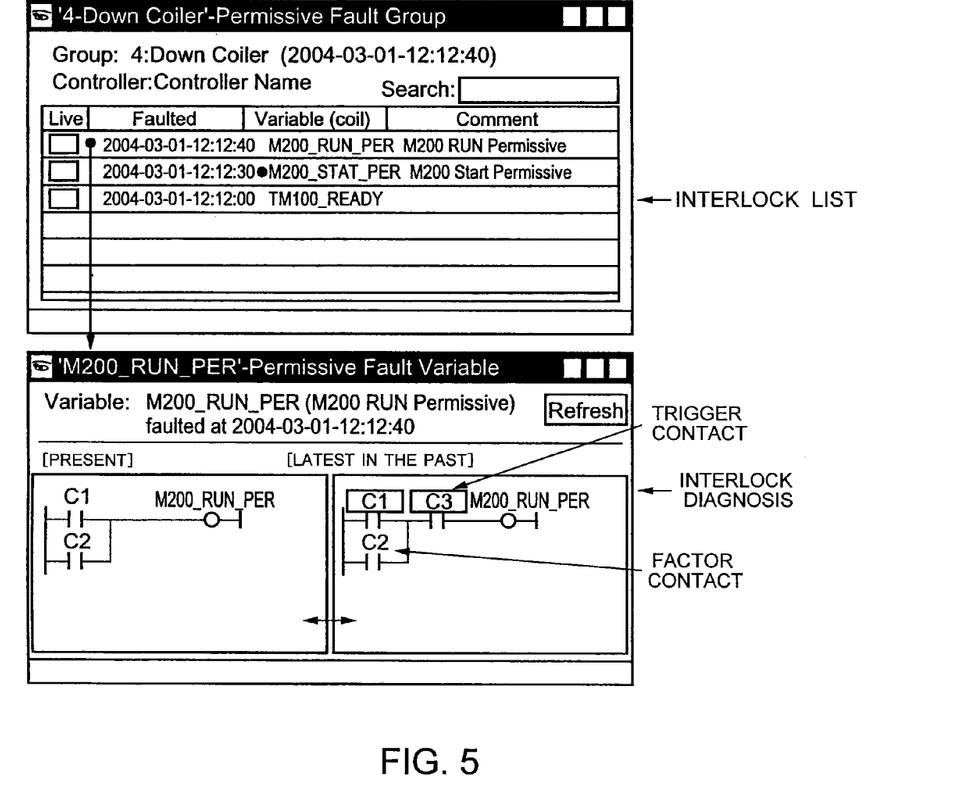
FIG. 5 is an explanatory diagram showing an example of an interlock diagnosis screen.

It is explained with reference to FIG. 5 how the interlock diagnosing means 20 functions to display a present factor and a latest factor in the past of the dissatisfaction of interlock. FIG. 5 shows an example of the interlock diagnosing means 20. In an interlock list, the interlock diagnosis function block displays a list of designated interlock conditions in the control program. This is a list of interlock conditions stored as the logical expression file of the database unit 30, i.e., a list of coil variables. The interlock diagnosis function block displays this list. In the list, a state of satisfaction and dissatisfaction of interlock conditions at the present point (field Live) and occurrence time at the time of latest dissatisfaction in the past (field Faulted) are displayed.

Actually, the interlock diagnosing means 20 learns an address in the controller of the interlock diagnosis function block from a relevant interlock signal name using the logical-expression readout unit 21 and passes the address to the interlock-state readout client unit 22. The interlock-state readout client unit 22 transfers the address to the interlock-state read out server unit 54 of the controller CONT through the LAN. In this way, the interlock diagnosing means 20 acquires an internal variable Permissive (a present interlock state) and TimeStamp (latest interlock dissatisfaction occurrence time in the past) of the interlock diagnosis function block under execution and displays the internal variable Permissive and TimeStamp in the fields Live and Faulted, respectively. Consequently, display of the interlock list can be realized. This interlock list is updated and displayed at intervals of about 1 to 2 seconds. When one interlock condition is selected from this interlock list, a relevant interlock diagnosis screen is displayed.

In a space of [present] in this interlock diagnosis screen, when a relevant interlock condition is dissatisfied at the present point, an interlock diagram of only a contact as a factor of the dissatisfaction is displayed in ladder. This is explained in the next step.

1) Acquisition of a Logical Expression

The interlock diagnosing means 20 gives a coil variable name of an interlock condition to the logical-expression readout unit 21, searches for data of a logical expression, and acquires data of a logical expression stored in the logical-expression file unit 23.

2) Acquisition of an Interlock State

The interlock diagnosing means 20 gives an address of the coil variable of the interlock condition to the interlock-state readout client unit 22 and acquires an internal data CurrentBits (a bit string in a connection state of a present interlock circuit) held by the interlock diagnosis function block on the controller.

3) Specifying of a Factor

Specifying of a factor is performed as internal processing of the factor-specified logical-expression converting unit 23. The interlock diagnosing means 20 gives the acquired data of the logical expression and internal data CurrentBits to the factor-specified logical-expression converting unit 23 and calculates a logical expression including only a factor contact. In this specifying of a factor, the interlock diagnosing means 20 applies an absorption law $1 \cdot A = A \cdot 1 = A$ of the Boolean algebra to the logical expression of the interlock circuit paying attention to a logical product term, a value of a contact of which is 1, and further applies an absorption law $1+A=A+1=1$ of the Boolean algebra to the logical expression paying attention to a logical sum term to simplify the logical expression of the interlock circuit.

As a result, all contacts that do not affect a result of the logical expression are deleted and a logical expression including only factor contacts that affect a result of the logical expression can be obtained.

The logical expression of the interlock circuit shown in FIG. 3 is as follows:

$$BI = C1 \cdot C2 \cdot C4 \cdot C5 + C1 \cdot C2 \cdot C6 + C3 \cdot C4 \cdot C5 + C3 \cdot C6 + C7$$

If a contact state obtained from the internal data CurrentBits is BI=0, C1=0, C2=1, C3=1, C4=1, C5=0, C6=0, and C7=0, (1) when the absorption law $A \cdot 1 = A \cdot 1$ is applied to the logical expression, the logical expression is changed as follows:

$$BI = C1 \cdot C5 + C1 \cdot C6 + C5 + C6 + C7$$

Moreover, (2) when the absorption law $A+1=1+A=1$ is applied to the logical expression, the logical expression is changed as follows:

$$BI = (C1 + 1)C5 +$$
$$(C1 + 1)C6 +$$
$$C7$$
$$= C5 + C6 + C7$$

The data structure can be represented as follows:

TABLE 5

|  | C1 | C2 | C3 | C4 | C5 | C6 | C7 |
|---|---|---|---|---|---|---|---|
| Path1 | 0 | 0 | 0 | 0 | 0 | 0 | 0 |
| Path2 | 0 | 0 | 0 | 0 | 0 | 0 | 0 |
| Path3 | 0 | 0 | 0 | 0 | 1 | 0 | 0 |
| Path4 | 0 | 0 | 0 | 0 | 0 | 1 | 0 |
| Path5 | 0 | 0 | 0 | 0 | 0 | 0 | 1 |

4) Logical Combination

When variables of the factor contents calculated in 3) are variables of coils of another interlock circuit, if the interlock circuit has been diagnosed by the interlock diagnosis function block, the interlock diagnosing means 20 carries out 1), 2), and 3) and calculates a logical expression with factors specified. The interlock diagnosing means 20 gives plural factor specified logical expressions selected in this way to the logical-expression combining unit 24. Consequently, it is possible to calculate a final factor specified logical expression.

For example, combination of a logical expression 1: $BI = C1 \cdot C2 \cdot C4 \cdot C5 + C1 \cdot C2 \cdot C6 + C7$ and a logical expression 2: $C1 = B1 + B2 \cdot B3$ is performed by combining:

data of the logical expression 1

TABLE 6

|  | C1 | C2 | C3 | C4 | C5 | C6 | C7 |
|---|---|---|---|---|---|---|---|
| Path1 | 1 | 1 | 0 | 1 | 1 | 0 | 0 |
| Path2 | 1 | 1 | 0 | 0 | 0 | 1 | 0 |
| Path3 | 0 | 0 | 0 | 0 | 0 | 0 | 1 | and

TABLE 7

|  | B1 | B2 | B3 |
|---|---|---|---|
| Path1 | 1 | 0 | 0 |
| Path2 | 0 | 1 | 1 | and the following data is obtained:

TABLE 8

|  | B1 | B2 | B3 | C2 | C3 | C4 | C5 | C6 | C7 |
|---|---|---|---|---|---|---|---|---|---|
| Path11 | 1 | 0 | 0 | 1 | 0 | 1 | 1 | 0 | 0 |
| Path12 | 0 | 1 | 1 | 1 | 0 | 1 | 1 | 0 | 0 |
| Path21 | 1 | 0 | 0 | 1 | 0 | 0 | 0 | 1 | 0 |
| Path22 | 0 | 1 | 1 | 1 | 0 | 0 | 0 | 1 | 0 |
| Path3 | 0 | 0 | 0 | 0 | 0 | 0 | 0 | 0 | 1 |

A combined logical expression is as follows:

$BI = B1 \cdot C2 \cdot C4 \cdot C5 +$     Path 11

$B1 \cdot B3 \cdot C2 \cdot C4 \cdot C5 +$     Path 12

$B1 \cdot C1 \cdot C2 \cdot C6 +$     Path 21

$B2 \cdot B3 \cdot C2 \cdot C6 +$     Path 22

$C7$     Path 3

5) Ladder Rendering

Figure 6:
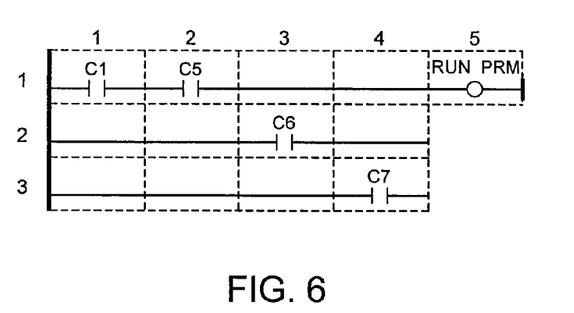
FIG. 6 is a circuit diagram showing an example of a ladder circuit obtained as a result of a logical-expression-to-ladder converting unit.

The interlock diagnosing means 20 subjects the logical expression obtained in this way to rendering processing as internal processing of the logical-expression-to-ladder converting unit 25. If attention is paid to the fact that data of the logical expression given here is always in a sum of products form, it is seen that a ladder only has to be rendered in association with a ladder circuit in which a logical product is a linear path and an overall logical sum merges only at one point.

For example, when the following data is given as the data of the logical expression,

TABLE 9

|       | C1 | C2 | C3 | C4 | C5 | C6 | C7 |
|-------|----|----|----|----|----|----|----|
| Path1 | 0  | 0  | 0  | 0  | 0  | 0  | 0  |
| Path2 | 0  | 0  | 0  | 0  | 0  | 0  | 0  |
| Path3 | 1  | 0  | 0  | 0  | 1  | 0  | 0  |
| Path4 | 0  | 0  | 0  | 0  | 0  | 1  | 0  |
| Path5 | 0  | 0  | 0  | 0  | 0  | 0  | 1  | the interlock diagnosing means 20 deletes columns of contacts that appear in no path or paths in which no contact appears and obtains the following data:

TABLE 10

|       | C1 | C5 | C6 | C7 |
|-------|----|----|----|----|
| Path3 | 1  | 1  | 0  | 0  |
| Path4 | 0  | 0  | 1  | 0  |
| Path5 | 0  | 0  | 0  | 1  |

From this data of the logical expression, the interlock diagnosing means 20 calculates the number of path MaxRow(=3) and the number of contacts MaxCol(=4).

Considering that a rendering area is a set of cells (Row, Col) indicated by a row Row and a column Col, the interlock diagnosing means 20 scans the rendering area from Row=1 to MaxRow,
scans the rendering area from Col=1 to MaxCol,
renders a left bus in the cell (Row, Col) if Col is 1,
renders a contact command and a contact variable if the cell (Row, Col) is 1,
renders a horizontal connection line if the cell (Row, Col) is 0,
when the scan of Row and Col is finished, renders a vertical connection line from a cell (1, MaxCol+1) to a cell (MaxRow, MaxCol+1), and
finally, renders a coil command and a coil variable in the cell (1, MaxCol+1).

FIG. 6 shows a ladder circuit obtained by this algorithm.

Referring back to FIG. 5, in a space of "latest in the past" of the interlock diagnosis screen shown in FIG. 5, at the time of dissatisfaction of a relevant interlock condition, the interlock diagnosing means 20 displays, in ladder, an interlock diagram including only contents as factors of the dissatisfaction of the interlock condition among latest factors in the past.

The same explanation as 1) to 5) above can be applied to this. However, it should be noted that what should be acquired in 2) is a value of the internal data AfterBits (a contact state at the time of a change in dissatisfaction of the interlock circuit) held by the interlock diagnosis function block on the controller. In this way, a ladder circuit with dissatisfaction factors specified is obtained in the space of [latest in the past]. Moreover, it is possible to indicate a contact that is a trigger (a first cause) of the interlock dissatisfaction among the dissatisfaction factors.

When the internal data BeforeBits (the bit string in the contact state immediately before interlock dissatisfaction) and the internal data Afterbits (the bit string of the contact state at the time of interlock dissatisfaction) of the interlock diagnosis function block are compared, a contact that changes from 1 to 0 is a trigger signal. Therefore, the contact only has to be shown on the ladder circuit in "latest in the past".

(Effect)

As described above, the first embodiment can provide the system programmer with the uniform and simple programming method of inserting the interlock diagnosis function block shown in FIG. 2 in the existing interlock circuit and can provide the system programmer with, as shown in FIG. 5, a factor contact and a trigger contact at the time of interlock dissatisfaction in present factors and latest factors in the past as a ladder circuit in a form that the system programmer can understand at a glance.

In particular, the presentation of present interlock dissatisfaction factors realizes a plant operation support function that plainly answers a question of the plant operator "I have just pressed the start button of the plant equipment. Why cannot the plant equipment be started?".

The presentation of latest interlock dissatisfaction factors in the past realizes a plant operation support function that plainly answers a question of the plant operator "The plant equipment has automatically stopped. When has the plant equipment stopped?". Presentation of a latest interlock dissatisfaction trigger factor in the past realizes a plant operation support function that plainly answers a question of the plant operator "The plant equipment has automatically stopped. What is a first cause?".

Second Embodiment

Figure 7:
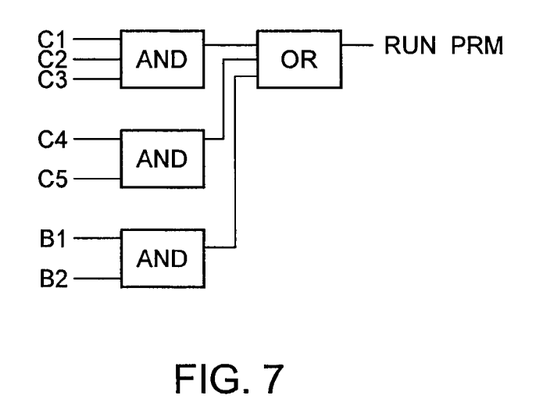
FIG. 7 is a circuit diagram of an interlock diagnosis circuit in an FBD format according to a second embodiment of the present invention.
Figure 8:
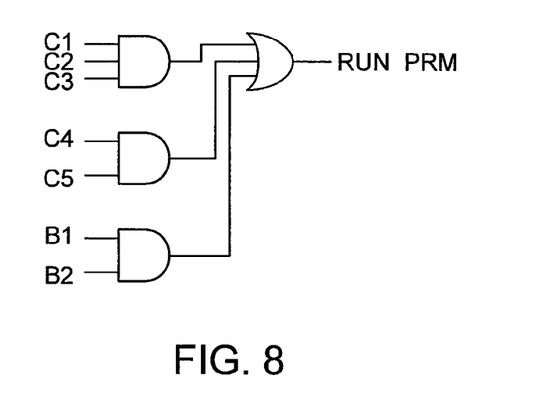
FIG. 8 is a circuit diagram of an interlock diagnosis circuit in an MIL format according to the second embodiment.
Figure 9:
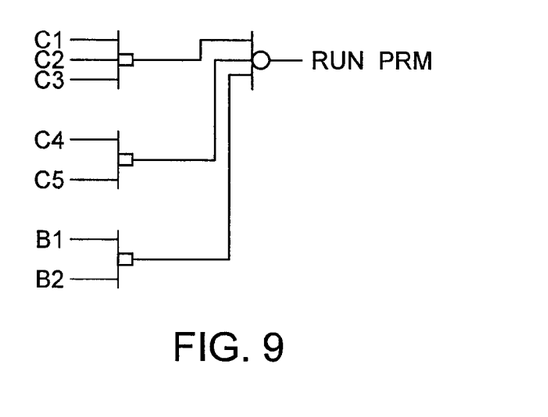
FIG. 9 is a circuit diagram of an interlock diagnosis circuit in an ISA format according to the second embodiment.

FIGS. 7 to 9 show a second embodiment of the present invention.

In the interlock diagnosis screen, the example of the ladder circuit is shown in the first embodiment. In the second embodiment, an example of another representation form is explained according to background knowledge of a plant operator. As logical circuit representation known in general, examples of an FBD sign, an MIL sign, and an ISA sign are shown in FIGS. 7 to 9, respectively.

Although an overall diagram and explanation of the embodiment are omitted, FIGS. 7 to 9 are different from FIG. 1 in that the logical-expression-to-ladder converting unit 12 is replaced with a logical-expression-to-FBD converting unit, a logical-expression-to-MIL converting unit, and a logical-expression-to-ISA converting unit in FIGS. 7 to 9, respectively. This is evident from the fact that a factor specifying logical expression can always be represented in a logical circuit form with a maximum two stages of a logical product and a logical sum because the factor specifying logical expression is held in a data form independent from a rendering method and this logical expression is always held in a simple sum of products form.

Third Embodiment

Figure 10:
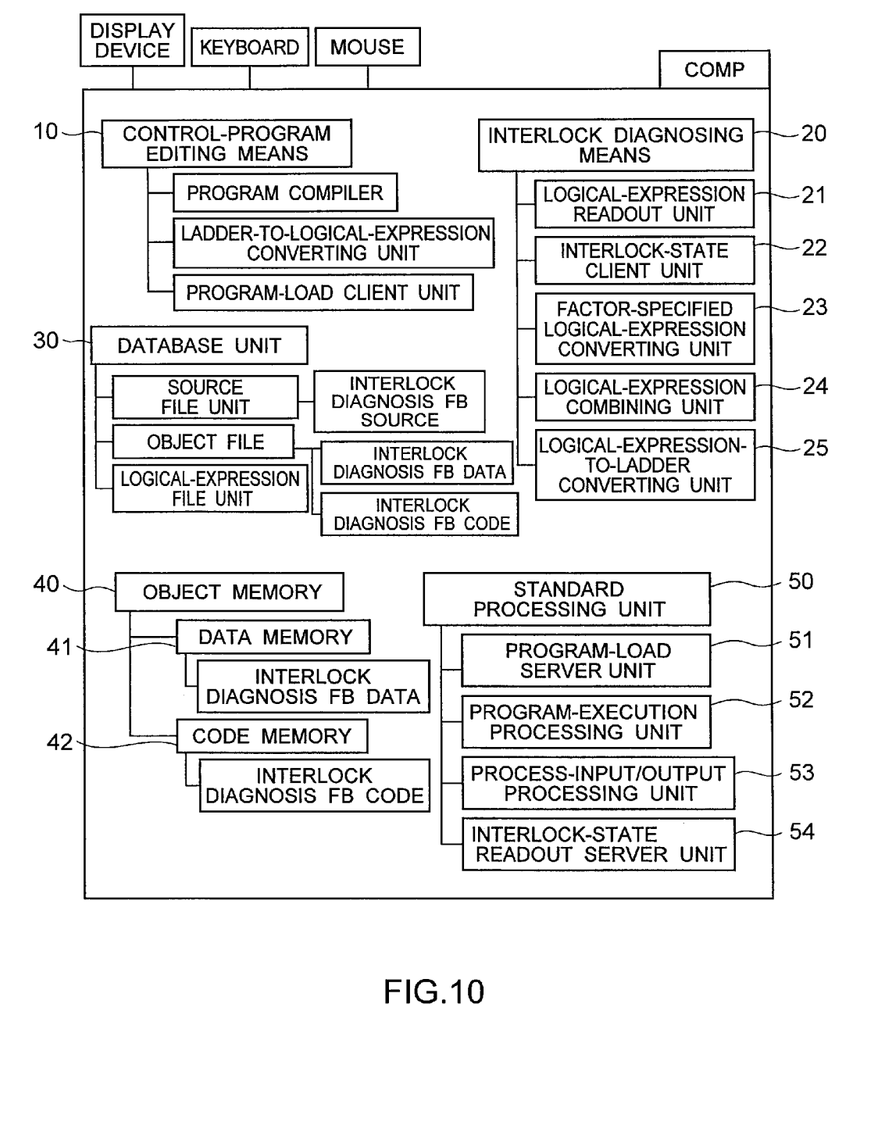
FIG. 10 is a conceptual diagram showing an overall configuration according to a third embodiment of the present invention.

FIG. 10 shows a third embodiment of the present invention. The first embodiment is divided into the computer COMP and the controller CONT. In connecting the computer COMP and the controller CONT through the LAN, the first embodiment generally has performance for coping with a large plant, for example, connecting plural controllers on plural LANs. On the other hand, the embodiment shown in FIG. 10 is a form in which means held by a controller is provided in this computer COMP. This is one of simple derivative forms that the present invention can carry out.

The invention claimed is:
1. A plant control system comprising: program editing means for creating a control program including an interlock condition and diagnosis of an interlock;

plant control means for executing a program object in the control program;

a display unit;

interlock diagnosing means for updating and automatically displaying on the display unit satisfaction/dissatisfaction of the interlock condition in a ladder circuit at a predetermined point in time before the present; and wherein the interlock diagnosing means specifies a contact that is a first trigger of the dissatisfaction of the interlock condition, and displays on the display unit only the first trigger contact of the dissatisfaction of the interlock condition in a graphic language even if plural stages of interlock circuits are formed.

2. The plant control system according to claim 1, wherein the interlock diagnosing means sets an interlock condition at a preset point in time as an object of the interlock condition at the predetermined point in time.

3. The plant control system according to claim 1, wherein the interlock diagnosing means sets a latest point in time in the past when dissatisfaction occurs as an object of the interlock condition at the predetermined point in time.

4. The plant control system according to claim 1, wherein the interlock diagnosing means displays a diagnostic indication on an identical diagnosis screen.

5. An interlock factor specifying method for performing execution and diagnosis of an interlock logic of a plant using a computer, the interlock factor specifying method comprising:

determining trigger factor variables that cause a logical function value to be set to 0 or 1 in order to cause a change in an interlock condition, wherein one of the trigger factor variables which is a first cause of the interlock condition change is identified as a first trigger factor variable;

reconfiguring, even if multiple stages of interlock conditions are formed, a logical function including only the first trigger factor variable of the trigger factor variables of the first cause of the interlock condition change; and displaying in a graphic language only the first trigger factor variable of the trigger factor variables of the first cause of the interlock condition change.

* * * * *